(12) United States Patent
Cho et al.

(10) Patent No.: US 7,271,531 B2
(45) Date of Patent: Sep. 18, 2007

(54) SURFACE LIGHT SOURCE DEVICE, METHOD OF MANUFACTURING THE SAME AND BACK LIGHT UNIT HAVING THE SAME

(75) Inventors: Seok-Hyun Cho, Seoul (KR); Ki-Yeon Lee, Suwon-si (KR); Jae-Hyeon Ko, Suwon-si (KR); Dong-Woo Kim, Suwon-si (KR); Hae-Soo Ha, Suwon-si (KR)

(73) Assignee: Samsung Corning Co., Ltd., Gyeonggi-do (KR)

( * ) Notice: Subject to any disclaimer, the term of this patent is extended or adjusted under 35 U.S.C. 154(b) by 32 days.

(21) Appl. No.: 10/992,217

(22) Filed: Nov. 19, 2004

(65) Prior Publication Data

US 2005/0110414 A1    May 26, 2005

(30) Foreign Application Priority Data

Nov. 26, 2003    (KR) ...................... 10-2003-0084606

(51) Int. Cl.
*H01J 1/62* (2006.01)
(52) U.S. Cl. .................. 313/493; 313/491; 313/495; 313/634; 313/582; 313/581
(58) Field of Classification Search ............... 313/634, 313/501, 220
See application file for complete search history.

(56) References Cited

U.S. PATENT DOCUMENTS

| 3,258,630 | A | * | 6/1966 | Scott ........................... 313/493 |
| 4,920,298 | A | * | 4/1990 | Hinotani et al. ............. 313/493 |
| 5,479,069 | A | * | 12/1995 | Winsor ........................ 313/493 |
| 5,509,841 | A | * | 4/1996 | Winsor ......................... 445/26 |
| 5,754,003 | A | * | 5/1998 | Murai et al. ................. 313/582 |
| 5,767,618 | A | * | 6/1998 | Maya et al. ................. 313/493 |
| 6,268,694 | B1 | * | 7/2001 | Fujimoto ..................... 313/491 |
| 6,670,756 | B2 | * | 12/2003 | Lin et al. ..................... 313/582 |
| 2002/0105259 | A1 | * | 8/2002 | Kim ............................ 313/491 |
| 2005/0007019 | A1 | * | 1/2005 | Kim et al. ................... 313/607 |
| 2005/0141238 | A1 | * | 6/2005 | Jang et al. ................... 362/555 |

FOREIGN PATENT DOCUMENTS

JP        2000082441 A  *   3/2000

* cited by examiner

*Primary Examiner*—Sikha Roy
(74) *Attorney, Agent, or Firm*—Lowe Hauptman Ham & Berner LLP

(57) ABSTRACT

A surface light source device includes a light source body, a partition member, an isolating member and a voltage applying part. The light source body has an internal space into which discharge gas is injected. The partition wall divides the internal space into discharge spaces. The partition wall has a connection hole that connects the discharge spaces with each other. The isolating member is disposed such that the isolating member corresponds to the connection hole. The isolating member seals the connection hole to isolate the discharge spaces from each other. The voltage applying part induces discharge of the discharge gas in the discharge spaces. Thus, current drift is prevented.

7 Claims, 11 Drawing Sheets

SURFACE LIGHT SOURCE DEVICE, METHOD OF MANUFACTURING THE SAME AND BACK LIGHT UNIT HAVING THE SAME

CROSS-REFERENCE TO RELATED APPLICATION

This application relies for priority upon Korean Patent Application No. 2003-84606 filed on Nov. 26, 2003, the contents of which are herein incorporated by reference in its entirety.

BACKGROUND OF THE INVENTION

1. Field of the Invention

The present invention relates to a surface light source device, a method of manufacturing the surface light source device and a back light unit having the surface light source device. More particularly, the present invention relates to a surface light source device having a stripe shaped discharge space, a method of manufacturing the surface light source device and a back light unit having the surface light source device as a light source.

2. Description of the Related Art

Generally, liquid crystal (LC) has a specific electrical and optical characteristic.

In detail, when electric fields that are applied to the LC are changed, an arrangement of the LC molecules is also changed. As a result, an optical transmittance is changed.

A liquid crystal display (LCD) apparatus uses the above-explained characters of LC to display an image. The LCD apparatus has many merits, for example such as a small volume, a lightweight, etc. Therefore, LCD apparatus is used in various fields, for example such as a notebook computer, a mobile phone, television set, etc.

The LCD apparatus includes a liquid crystal controlling part and a light providing part. The liquid crystal controlling part controls the LC. The light providing part provides the liquid crystal controlling part with a light.

The liquid crystal controlling part includes a pixel electrode formed on a first substrate, a common electrode formed on a second substrate and a liquid crystal layer interposed between the pixel electrode and the common electrode. A number of the pixel electrode is determined in accordance with resolution, and a number of the common electrode is one. Each of the pixel electrodes is electrically connected to a thin film transistor (TFT), so that a pixel voltage is applied to the pixel electrode through the TFT. A reference voltage is applied to the common electrode. Both of the pixel electrode and common electrode include an electrically conductive and optically transparent material.

The light providing part provides the liquid crystal controlling part with a light. The light generated from the light providing part passes through the pixel electrode, the liquid crystal layer and the common electrode in sequence. Therefore, luminance and uniformity of the luminance have great influence on a display quality of the LCD apparatus.

A conventional light providing part employs a cold cathode fluorescent lamp (CCFL) or a light emitting diode (LED). The CCFL has a long cylindrical shape, and the LED has a small dot shape.

The CCFL has a high luminance and a long lifespan, and generates small amount of heat. The LED has low power consumption and a high luminance. However, both the CCFL and LED have a low uniformity of luminance.

Therefore, in order to enhance the uniformity of luminance, the light providing part requires optical members such as a light guide plate (LGP), a diffusion member, a prism sheet, etc. Therefore, a volume and a weight of the LCD apparatus increase.

In order to solve above-mentioned problem, a surface light source device has been developed. A conventional surface light source device includes a first and second substrates spaced apart from each other, and a plurality of partition walls interposed between the first and second substrate. The partition walls are arranged in parallel with each other to define a plurality of discharge spaces. A sealing member is interposed between the first and second substrates to combine the first and second substrates. Discharge gas is injected into the discharge space. Electrodes for applying voltage to the discharge gas are formed at edge portion of the first and second substrates.

In order to maintain a pressure of the discharge spaces, the discharge spaces are connected to each other. For example, the partition walls are disposed alternately, so that the discharge spaces form a serpentine shape. Alternatively, a portion of the partition walls may be cut or holes may be formed at the partition walls to connect the discharge space with each other. Therefore, the discharge gas is distributed uniformly.

In order to define the discharge spaces, one of the first and second substrates may be transformed to form a partition wall that is integrally formed with the one of the first and second substrates (hereinafter, referred to as "substrate transforming method"). Alternatively, a partition wall that is separately formed with the first and second substrates may be interposed between the first and second substrates to define the discharge space between the first and second substrates (hereinafter, referred to as "partition inserting method").

According to the substrate transforming method, a glass substrate is heated and compressed by mold, so that the glass substrate is transformed to have a plurality of furrows. The transformed glass substrate is combined with other glass substrate by frit. A space between the furrows corresponds to the discharge space, and the furrows correspond to the partition walls.

According to the partition inserting method, a partition wall including glass or ceramic is formed on a glass substrate, and other glass substrate is combined with the partition wall. Therefore, a space defined by the glass substrates and the partition wall corresponds to the discharge space.

FIG. 1 is a partially cutout perspective view illustrating a conventional surface light source device.

Referring to FIG. 1, a conventional surface light source device 100 includes a light source body 110, a plurality of partition walls 120 and a voltage applying part 130. The light source body 110 includes a first substrate 112, a second substrate 114 and a sealing member 116. The sealing member 116 is disposed along edge portion of the first and second substrates 112 and 114. The partition walls 120 are disposed between the first and second substrates 112 and 114 such that the partition walls 120 are parallel with each other. The spaces between the partition walls 120 are defined as the discharge space.

First end of odd numbered partition walls makes contact with the sealing member 116, and second end of the even numbered partition walls makes contact with the sealing member 116. Therefore, the discharge spaces defined by the partition walls 120 are connected to each other and have a serpentine shape.

Therefore, discharge gas injected into the discharge space spreads uniformly, and the discharge spaces have same pressure.

The light source body 110 includes a fluorescent layer formed on a surface of the first and second substrates 112 and 114, and the partition walls 120.

The voltage applying part 130 includes two electrodes 130a and 130b. The electrodes 130a and 130b are disposed at opposite end of the light source body 110, such that a longitudinal direction of the electrodes 130a and 130b is substantially perpendicular with a longitudinal direction of the partition wall 120. A conductive tape may be employed as the electrodes 130a and 130b.

When discharge voltages are applied to the electrodes 130a and 130b, discharge gas disposed in the discharge space generates ultraviolet light. The ultraviolet light generated from the discharge gas is converted into a visible light by the fluorescent layer.

However, according to the conventional surface light source device of which discharge spaces having serpentine shape, plasma is concentrated in one of the discharge space due to minute difference. Then, the difference becomes more serious. The above-mentioned effect is referred to as "current drift effect", "cross talk effect" or "channeling effect". The above-mentioned current drift effect is observed even the conventional surface light source device having partition wall or partition walls having connection hole that connects the discharge spaces.

The current drift effect lowers the uniformity of luminance. Therefore, when an LCD apparatus employs the conventional surface light source device, a display quality is deteriorated.

SUMMARY OF THE INVENTION

The present invention provides a surface light source device having a plurality of discharge spaces isolated from each other.

The present invention also provides a method of manufacturing the surface light source device.

The present invention still also provides a back light unit having the surface light source device as a light source.

In an exemplary surface light source device according to the present invention, the surface light source device includes a light source body, at least one partition member, an isolating member and a voltage applying part. The light source body has an internal space into which discharge gas is introduced. The partition wall divides the internal space into a plurality of discharge spaces. The partition wall has a connection hole that connects the discharge spaces with each other. The isolating member fills the connection hole to isolate the discharge spaces from each other. The voltage applying part induces discharge of the discharge gas in the discharge spaces isolated from each other.

In another exemplary surface light source device according to the present invention, the surface light source device includes a light source body, an isolating member, at least one partition member and a voltage applying part. The light source body has an internal space into which discharge gas is introduced, and a connection hole through which the discharge gas may flow. The isolating member fills the connection hole to seal the connection hole. The partition wall divides the internal space into a plurality of discharge spaces. The partition wall is disposed such that the connection hole connects the discharge spaces isolated by the partition wall. The voltage applying part induces discharge of the discharge gas in the discharge spaces isolated from each other.

In an exemplary method of manufacturing a surface light source device, a light source body having partition walls that define discharge spaces isolated from each other is provided. A connection hole is provided to the light source body to connect the discharge spaces. An isolation member including a soft material is disposed in the connection hole. A voltage applying part for applying a voltage the discharge gas is then provided to the light source body. The isolating member is softened to seal the connection hole.

In still another exemplary a back light unit according to the present invention, a surface light source device includes a light source body having an internal space into which a discharge gas is introduced, at least one partition wall dividing the internal space into a plurality of discharge spaces, the partition wall having a connection hole that connects the discharge spaces with each other, an isolating member filling the connection hole to isolate the discharge spaces from each other, and a voltage applying part for applying a voltage to the discharge gas to generate a discharge in the discharge spaces isolated from each other. A case receives the surface light source device. An optical sheet is interposed between the surface light source device and the case. An inverter applies a voltage to the voltage applying part.

According to the present invention, after the discharge gas is introduced into the discharge spaces, the isolation member fills the connection hole so that the discharge spaces are isolated from each other. Therefore, the current drift effect between the discharge spaces may be prevented.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF EMBODIMENTS

Hereinafter the embodiments of the present invention will be described in detail with reference to the accompanied drawings.

Embodiment 1

Figure 1:
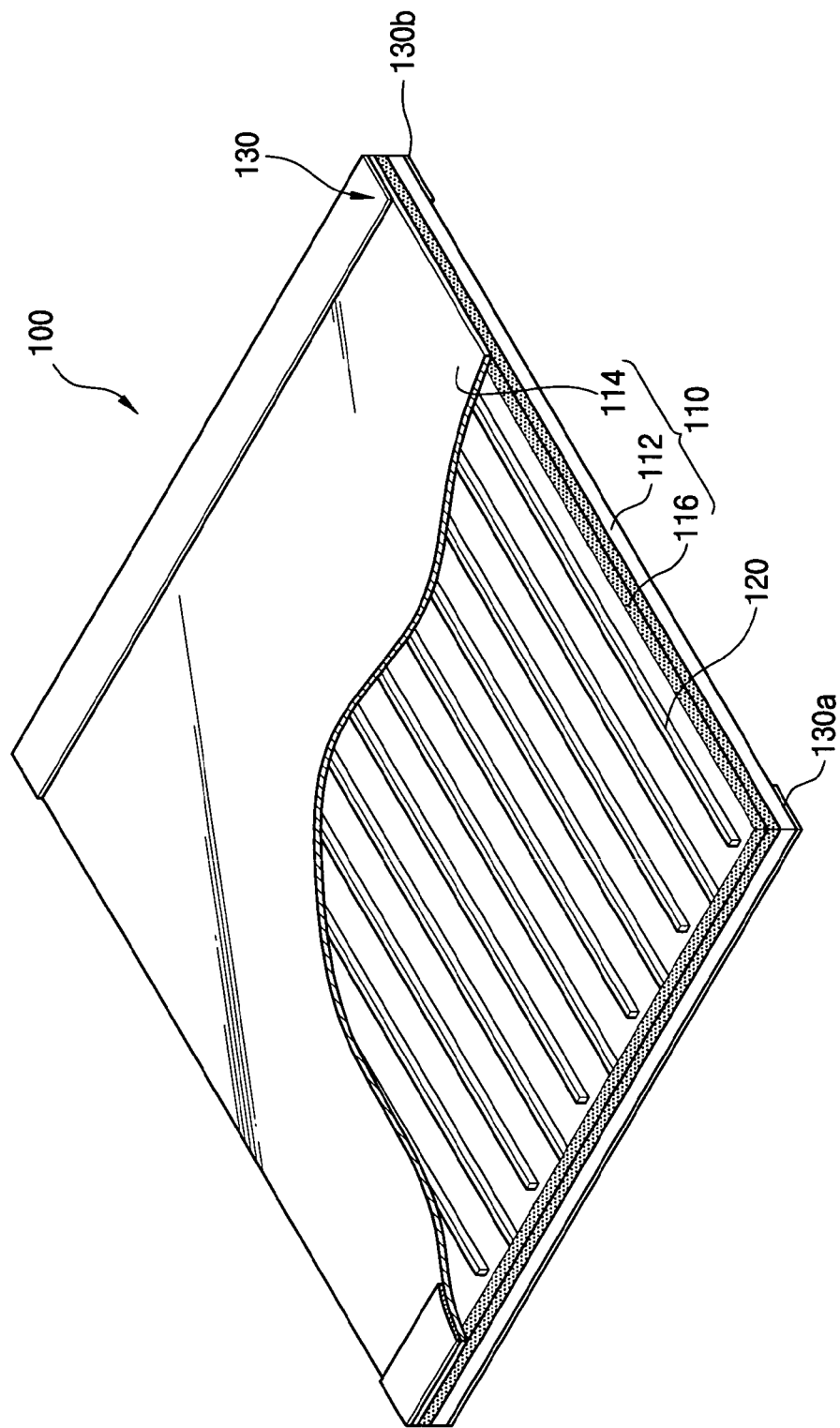
FIG. 1 is a partially cutout perspective view illustrating a conventional surface light source device.
Figure 2:
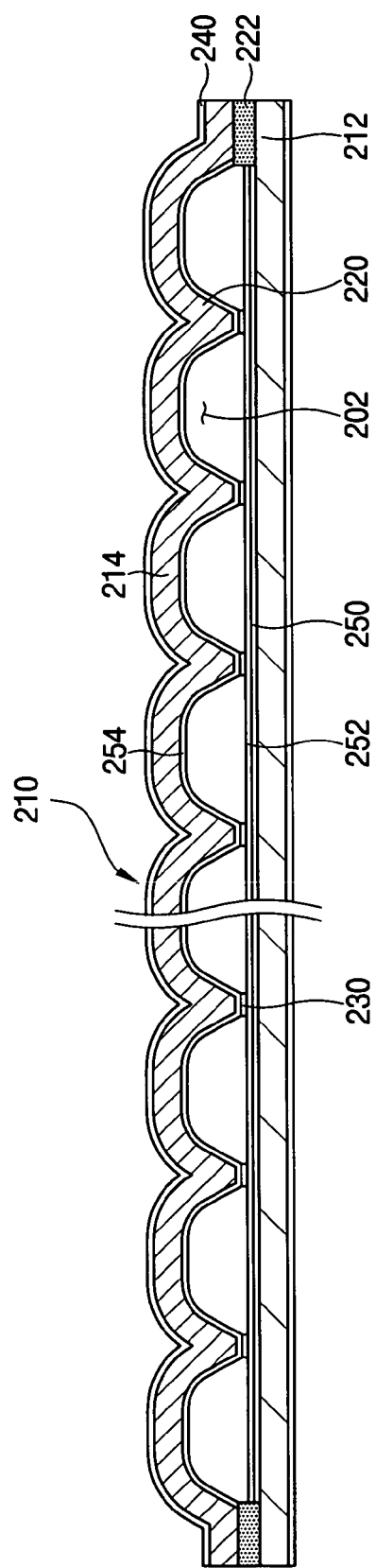
FIG. 2 is a cross-sectional view taken along a virtual line that is substantially parallel with a width direction of a surface light source device according to a first exemplary embodiment of the present invention.
Figure 3:
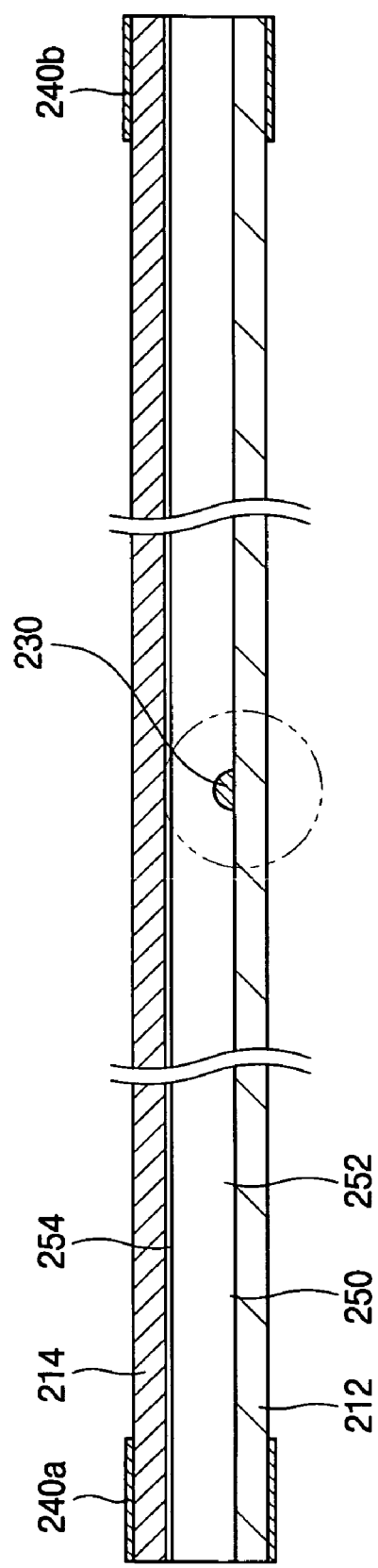
FIG. 3 is a cross-sectional view taken along a virtual line that is substantially parallel with a longitudinal direction of a surface light source device in FIG. 2.
Figure 4:
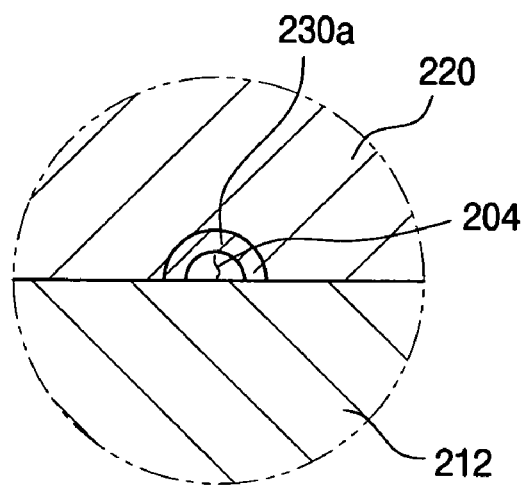
FIG. 4 is an enlarged view illustrating an isolating member in FIG. 3, before softening the isolating member.
Figure 5:
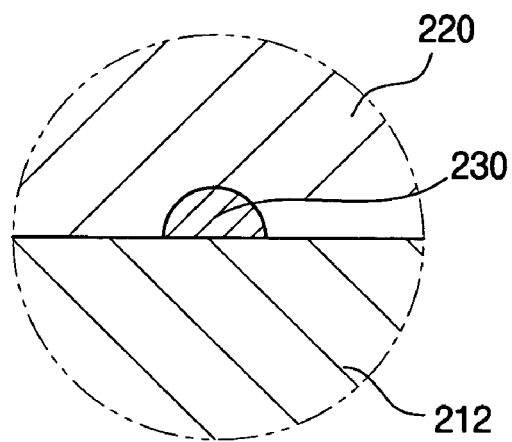
FIG. 5 is an enlarged view illustrating an isolating member in FIG. 3, after softening the isolating member.

FIG. 2 is a cross-sectional view taken along a virtual line that is substantially parallel with a width direction of a surface light source device according to a first exemplary embodiment of the present invention. FIG. 3 is a cross-sectional view taken along a virtual line that is substantially parallel with a longitudinal direction of a surface light source device in FIG. 2. FIG. 4 is an enlarged view illustrating an isolating member in FIG. 3, before softening the isolating member. FIG. 5 is an enlarged view illustrating an isolating member in FIG. 3, after softening the isolating member.

Referring to FIGS. 2 to 5, a surface light source device 200 according to a first exemplary embodiment of the present invention includes a light source body 210, at least one partition wall 220, an isolating member 230 and a voltage applying part 240.

The light source body 210 has an internal space having discharge gas injected therein. The light source body 210 has a plate shape. The light source body 210 includes a first substrate 212 and a second substrate 214. The first substrate 212 has a light reflecting surface that reflects a light generated from the discharge gas disposed in the internal space, and the second substrate 214 has a light exiting surface through which the light exits the light source body 210. The light reflecting face corresponds to a surface of the first substrate 212 that faces the second substrate 214. The light-exiting surface corresponds to a surface of the second substrate 214 that is opposite to the first substrate 212.

The partition wall 220 divides the internal space of the light source body 210 into a plurality of discharge spaces. A portion of the second substrate 214 forms the partition wall 220. That is, second substrate 214 includes a plurality of furrows that correspond to the partition wall 220. The second substrate 214 having the partition wall 220 may be formed through various ways. The discharge space 202 has a tunnel shape of which cross-section has various shape, for example semi-circle, etc.

The partition wall 220 includes a connection hole 204 that connects the discharge spaces defined by the partition wall 220 with each other. The connection hole 204 may be formed such that a longitudinal direction of the connection hole 204 is substantially perpendicular to a longitudinal direction of the discharge space 202.

The first substrate 212 is combined with the second substrate 214 having the partition walls 220 integrally formed with the second substrate 214 with a sealing frit 222. The connection hole 204 uniformizes pressures of each of the discharge spaces 202. That is, discharge gas spreads to each of the discharge spaces 202 through the connection hole 204. Examples of the discharge gas include Mercury (Hg) gas, argon (Ar), neon (Ne), xenon (Xe), etc.

The isolating member 230 seals the connection hole 204 after the discharge gas is injected into the discharge spaces 202, so that the discharge spaces 202 is completely isolated. The isolating member 230 includes a material that may be softened. The isolating member 230 may include frit. The isolating member 230 is disposed in the connection hole 204. A cross-section of the isolating member 230 has a horseshoe shape that corresponding the inner surface of the connection hole 204 (hereinafter, the isolating member 230 having the horseshoe shape is referred to as a horseshoe isolating member 230a). The isolating member 230 may be attached to the inner surface of the connection hole 204 by an adhesive. Therefore, when the discharge gas is injected into the discharge spaces 202, the discharge spaces 202 is connected to each other by the connection hole 204, so that the discharge gas may be uniformly distributed.

When the discharge gas is injected into the discharge spaces 202 completely, the horseshoe isolating member 230a is heated to be softened. Therefore, the isolating member 230 seals the connection hole 204. Then, the isolating member 230 is cooled down to be hardened. During heating the horseshoe isolating member 230a, only a portion of the connection hole 204 is heated. That is, the frit 222 connected between the first substrate 212 and the second substrate 214 is not heated.

Preferably, the horseshoe isolating member 230a has a softening temperature higher than that of the frit 222. Furthermore, the horseshoe isolating member 230a has a softening temperature lower than that of the first and second substrates 212 and 214. Therefore, when the frit 222 is heated in order to combine the first and second substrates 212 and 214, the horseshoe isolating member 230a is not softened. Furthermore, when the horseshoe isolating member 230a is heated in order to seal the connection hole 204, the first and second substrates 212 and 214 are not softened.

Each of the discharge spaces 202 is completely isolated from each other through the isolating member 230. Therefore, the current drift effect between the discharge spaces 202 is prevented.

The voltage applying part 240 includes first and second electrodes 240a and 240b. The first and second electrodes 240a and 240b are disposed at each end portion of the light source body 210 such that a longitudinal direction of the first and second electrodes 240a and 240b is substantially perpendicular to a longitudinal direction of the discharge spaces 202.

A conductive material may be coated on the end portion of the light source body 210 to form the first and second electrodes 240a and 240b. Alternatively, a conductive tape may be attached to the end portion of the light source body 210 to form the first and second electrodes 240a and 240b. In FIG. 3, the first and second electrodes 240a and 240b are formed on both surface of the first and second substrates 212 and 214. Alternatively, the first and second electrodes 240a and 240b are formed only on a surface of the second substrate 214, or the first and second electrodes 240a and 240b may be disposed inside of the light source body 210.

The light source body 210 further includes a light reflecting layer 250 formed on the surface of the first substrate 212 and a first fluorescent layer 252 formed on the light-reflecting layer 250. Examples of the light reflecting layer 250 include titanium oxide ($TiO_2$), aluminum oxide ($Al_2O_3$), etc. The light reflecting layer 250 may be formed by a chemical vapor deposition (CVD) method, a spray coating method, a sputtering method, etc. The light reflecting layer 250 reflects a visible light that advances toward the first substrate 212 toward the second substrate 214.

The light source body 210 further includes a second fluorescent layer 254 formed on an internal surface of the second substrate 214. The second fluorescent layer 254 has preferably a thickness less than that of the first fluorescent layer 252.

When discharge voltages are applied to the first and second electrodes 240a and 240b, the discharge gas is changed into plasma state and an ultraviolet light is generated. The ultraviolet light is transformed into a visible light by the first and second fluorescent layers 252 and 254.

The visible light exits from the light source body 210 through only the second substrate 214. Alternatively, when the light reflecting layer 250 and the first fluorescent layer 252 are formed on an internal surface of the second substrate 214, and the second fluorescent layer 254 is formed on an internal surface of the first substrate 212, the visible light may exit from the light source body 210 through only the first substrate 212. When the light reflecting layer 250 is not formed on internal surfaces of the first and second substrates 212 and 214, the visible light may exit from the light source body 210 through the first and second substrates 212 and 214.

Figure 6:
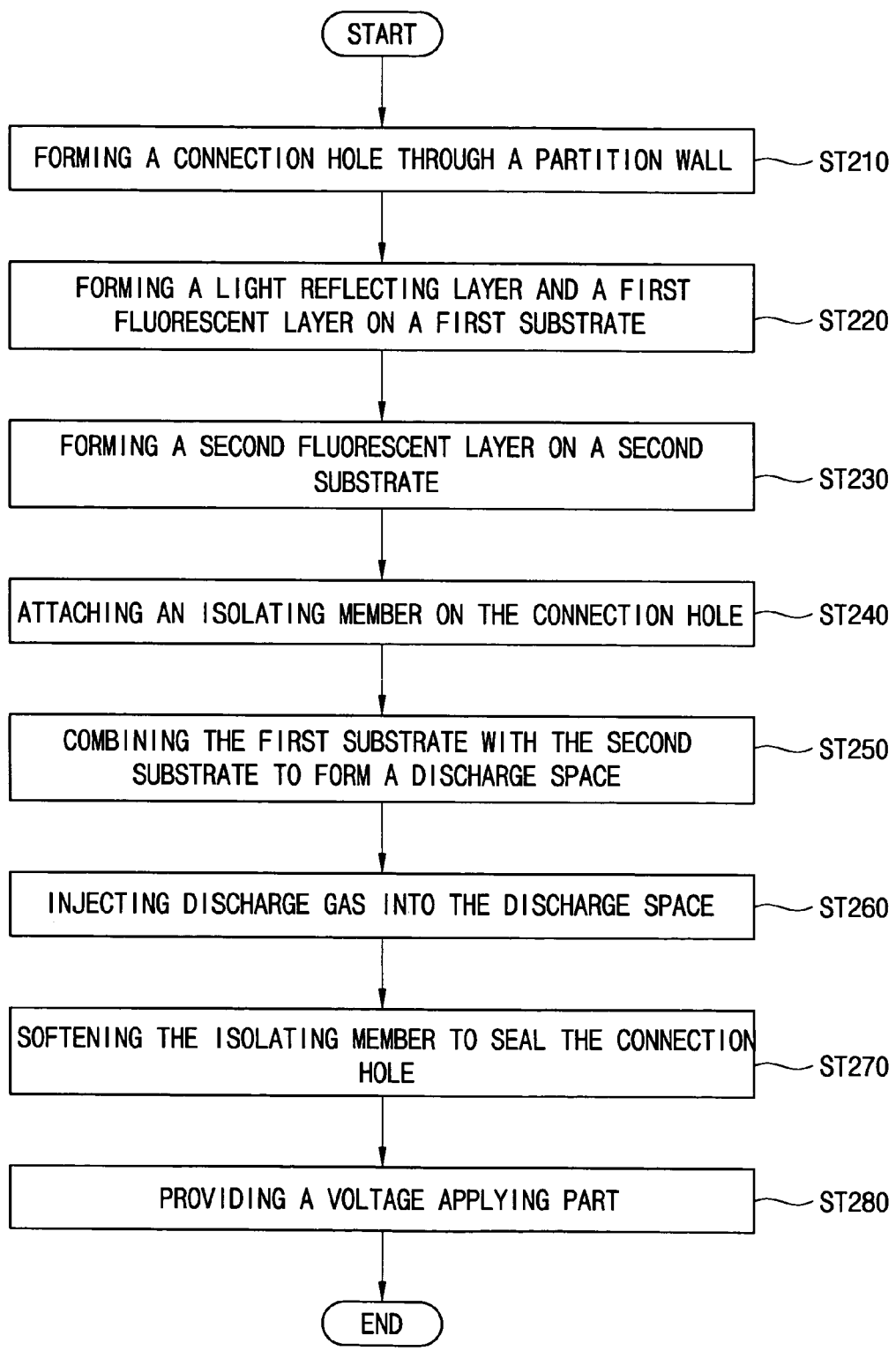
FIG. 6 is a flow chart showing a method of manufacturing the surface light source device in FIGS. 2 and 3.

FIG. 6 is a flow chart showing a method of manufacturing the surface light source device in FIGS. 2 and 3.

Referring to FIG. 6, in step ST210, the connection hole 204 is formed through the partition wall 220 that is integrally formed with the second substrate 214.

In step ST220, the light-reflecting layer 250 and the first fluorescent layer 252 are formed on the first substrate 212 in sequence. The light-reflecting layer 250 includes titanium oxide ($TiO_2$), aluminum oxide ($Al_2O_3$), etc. The light reflecting layer 250 may be formed by the CVD method, the spray coating method, the sputtering method, etc.

In step ST230, the second fluorescent layer 254 is formed on the second substrate 214.

In step ST240, the horseshoe isolating member 230a is attached to internal surface of the connection hole 204. Preferably, the horseshoe isolating member 203a has a softening temperature point higher than that of the frit 222. Therefore, when the frit 222 is heated in order to combine the first and second substrates 212 and 214, the horseshoe isolating member 203a is not softened.

In step ST250, the first and second substrates 212 and 214 are combined with each other so that the discharge spaces 202 connected to each other through the connection hole 204 are formed.

In step ST260, the discharge spaces 202 are exhausted to be a vacuum state, and the discharge gas is injected into the discharge spaces 202. The discharge gas is uniformly distributed throughout the discharge spaces 202 because the discharge spaces 202 are connected to each other through the connection hole 204. The discharge gas may be injected into the discharge spaces 202 with a gas injection unit of a high frequency heating equipment. The gas injection unit of the high frequency heating equipment may include a getter for eliminating oxygen ($O_2$), nitrogen ($N_2$), carbon monoxide (CO), carbon dioxide ($CO_2$), water vapor ($H_2O$), etc.

In step ST270, the horseshoe isolating member 230a is softened to seal the connection hole 204. Therefore, the discharge spaces 202 having the discharge gas injected thereinto are isolated from each other. A portion at which the horseshoe isolating member 203a is formed is heated locally in order that the frit for combining the first and second substrates 212 and 214 may not softened. The horseshoe isolating member 203a has a softening temperature lower than that of the first and second substrates 212 and 214.

Then, the voltage applying part 240 is formed on outer surface of the first and second substrates 212 and 214. The voltage applying part 240 includes the first and second electrodes 240a and 240b. The first and second electrodes 240a and 240b are formed on end portion of the light source body 210 such that the longitudinal direction of the first and second electrodes 240a and 240b is substantially perpendicular to a longitudinal direction of the discharge spaces 202.

The discharge spaces 202 are isolated completely so that the current drift effect is prevented.

Embodiment 2

Figure 7:
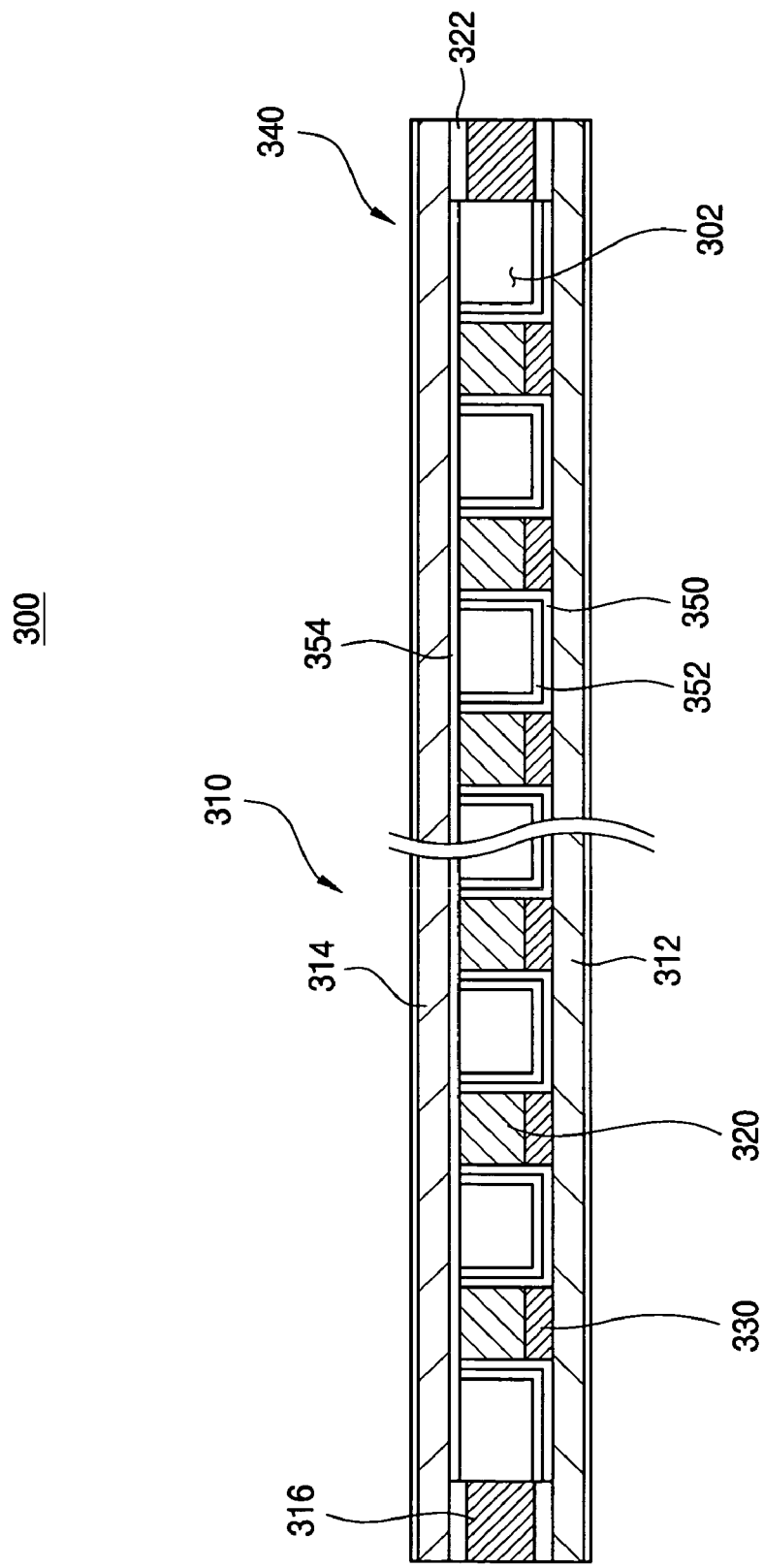
FIG. 7 is a cross-sectional view taken along a virtual line that is substantially parallel with a width direction of a surface light source device according to a second exemplary embodiment of the present invention.
Figure 8:
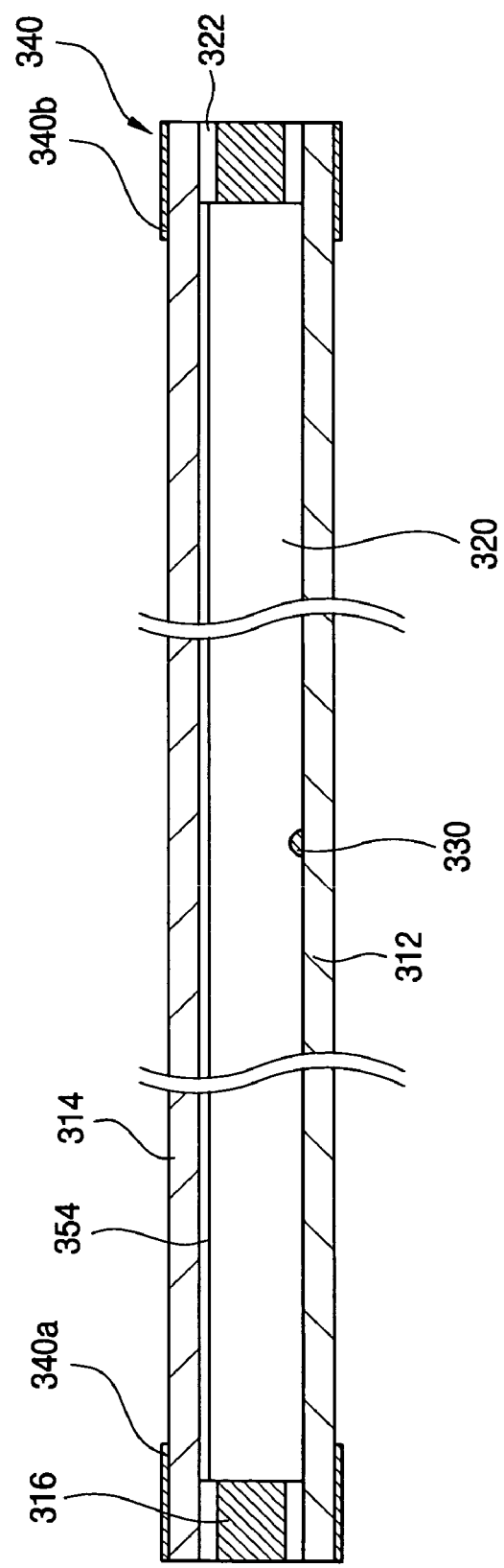
FIG. 8 is a cross-sectional view taken along a virtual line that is substantially parallel with a longitudinal direction of the surface light source device in FIG. 7.

FIG. 7 is a cross-sectional view taken along a virtual line that is substantially parallel with a width direction of a surface light source device according to a second exemplary embodiment of the present invention, and FIG. 8 is a cross-sectional view taken along a virtual line that is substantially parallel with a longitudinal direction of the surface light source device in FIG. 7.

Referring to FIGS. 7 and 8, a surface light source device 300 according to a second exemplary embodiment of the present invention includes a light source body 310, at least one partition wall 320, an isolating member 330 and a voltage applying part 340.

The light source body 310 includes an internal space having discharge gas injected thereinto. The light source body 310 has a plate shape. The light source body 310 includes a first substrate 312, a second substrate 314 and a sealing member 316. The first substrate 312 includes a light-reflecting surface. The second substrate 314 includes a light-exiting surface. The sealing member 316 has a rectangular ring shape and is interposed between the first and second substrates 312 and 314. The sealing member 316 is disposed along edge portions of the first and second substrates 312 and 314 to form the internal space of the light source body 310.

The partition wall 320 divides the internal space of the light source body 310 into a plurality of discharge spaces. The partition wall 320 defines a plurality of discharge spaces 302 having a stripe shape. The partition wall 320 may includes substantially same material as that of the first and second substrates 312 and 314. Alternatively, the partition wall 320 may include different materials from that of the first and second substrates 312 and 314. Examples of the partition wall 320 include glass, ceramic, etc.

The first and second substrates 312 and 314, the partition walls 320 and the sealing member 316 is combined together with the frit 322 to define the discharge spaces 302.

Each of the partition walls 320 includes a connection hole. The connection hole is disposed at a portion of the partition wall 320 adjacent to the first substrate 312. The connection hole connects the discharge spaces with each other.

A frit having a horseshoe shape is attached to an internal surface of the connection hole. The frit corresponds to an isolating member that seals the connection hole when the discharge gas is injected into the discharge spaces 302. When the connection hole has a tunnel shape, the frit has a horseshoe shape corresponding to the tunnel shape.

A light-reflecting layer 350 is formed on an internal surface of the first substrate 312, and a first fluorescent layer 352 is formed on the light-reflecting layer 350. A second fluorescent layer 354 is formed on an internal surface of the second substrate 314.

As shown in FIG. 7, the light-reflecting layer 350 and the first fluorescent layer 352 may be extended to side surfaces of the partition walls 320.

The voltage applying part 340 includes first and second electrodes 340a and 340b. The first and second electrodes 340a and 340b are disposed on end portion of the light source body 310 such that the longitudinal direction of the first and second electrodes 340a and 340b is substantially perpendicular to a longitudinal direction of the discharge spaces 302. Alternatively, the first and second electrodes 340a and 340b may be disposed in the light source body 310.

Additional elements of the surface light source device 300 may be similar to that of the surface light source device 200 in Embodiment 1. Therefore, any further explanation will be omitted.

Figure 9:
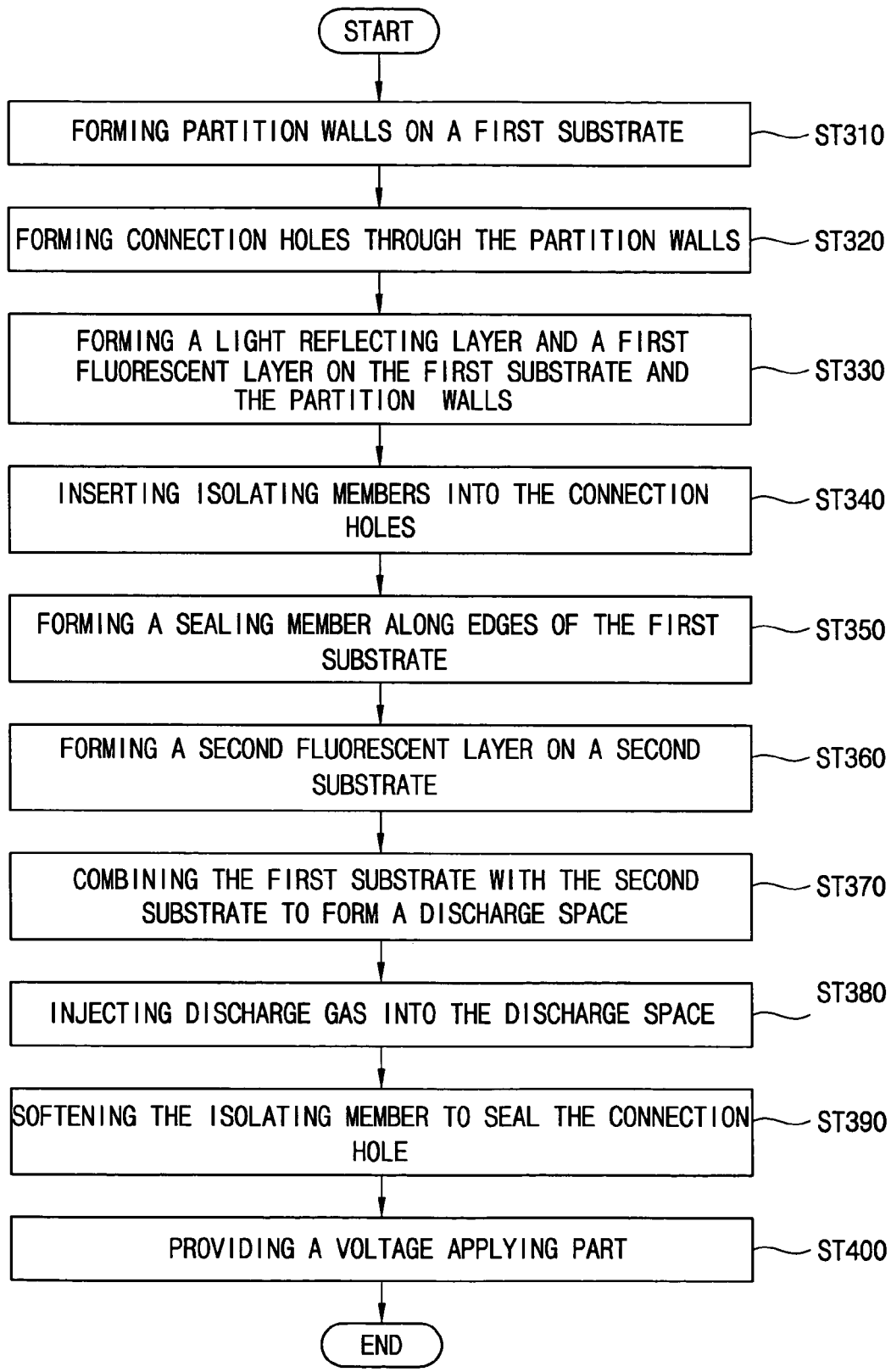
FIG. 9 is a flow chart showing a method of manufacturing the surface light source device in FIGS. 7 and 8.

FIG. 9 is a flow chart showing a method of manufacturing the surface light source device in FIGS. 7 and 8.

Referring to FIG. 9, in step ST310, the partition walls 320 are formed on the first substrate 312.

In step ST320, the connection holes are formed through the partition walls 320.

In step ST330, the light reflecting layer 350 and the first fluorescent layer 352 are sequentially formed on the first substrate 312 and the partition walls 320.

In step ST340, the horseshoe isolating members are inserted into the connection holes.

In step ST350, the sealing member 316 is formed along edges of the first substrate 312. The sealing member 316 may be previously formed before forming the partition walls 320.

In step ST360, The second fluorescent layer 354 is formed on the second substrate 314.

In step ST370, the first and second substrates 312 and 314 are assembled together such that the first and second fluorescent layers 352 and 354 face each other. Therefore, the discharge spaces 302 connected to each other are formed.

In step ST380, the discharge spaces 302 are exhausted to be a vacuum state, and the discharge gas is injected into the discharge spaces 302.

In step ST390, the horseshoe is softened to seal the connection hole of the partition walls 320. Therefore, the discharge spaces having the discharge gas injected thereinto are completely isolated from each other.

In step ST400, the voltage applying part 340 is formed on a surface of the first and second substrates 312 and 314.

Embodiment 3

Figure 10:
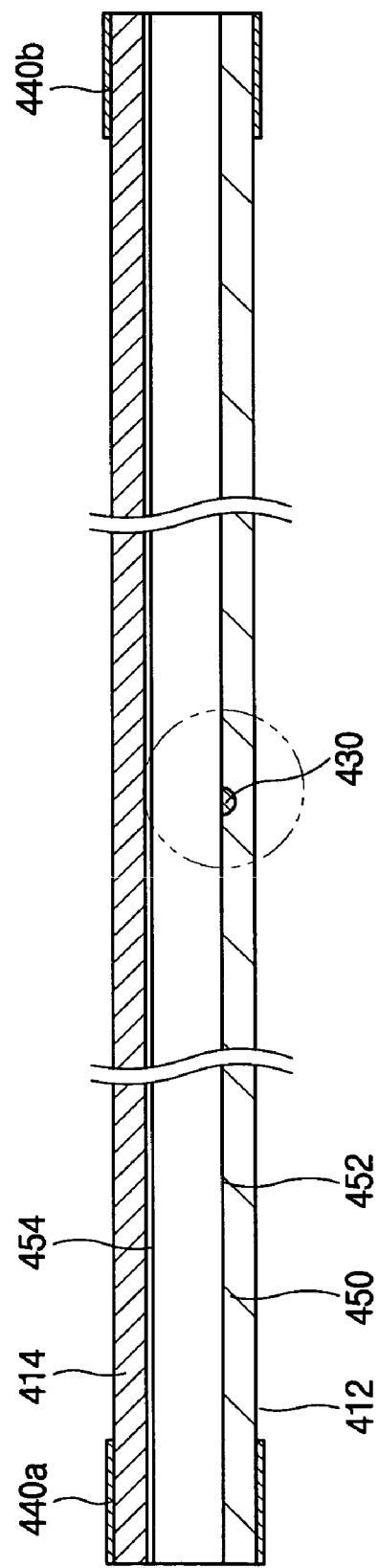
FIG. 10 is a cross-sectional view taken along a virtual line that is substantially parallel with a longitudinal direction of a surface light source device according to a third exemplary embodiment of the present invention.

FIG. 10 is a cross-sectional view taken along a virtual line that is substantially parallel with a longitudinal direction of a surface light source device according to a third exemplary embodiment of the present invention.

Referring to FIG. 10, a surface light source device 400 according to the present embodiment includes a light source body, at least one partition member 420, an isolating member 430 and a voltage applying part 440.

The light source body includes a first substrate 412 having a light-reflecting surface, and a second substrate 414 having a light exiting surface.

An internal space of the light source body is divided into a plurality of discharge spaces. The partition walls 420 are integrally formed with the second substrate 414 as the partition walls 220 in FIG. 2. The partition walls 420 may be formed by various methods, for example a molding.

Connection holes are formed on the first substrate 412. The connection holes connect the discharge spaces isolated by the partition walls 420. That is, a position at which the connection holes are formed is a different point between Embodiment 1 and Embodiment 3. When the discharge gas is injected into the discharge spaces, the discharge spaces are isolated from each other through isolating member 430.

The first and second substrates 412 and 414 are assembled together by a frit.

The voltage applying part 440 includes first and second electrodes 440a and 440b. The first and second electrodes 440a and 440b are disposed on each end portion of the light source body such that a longitudinal direction of the first and second electrodes 440a and 440b is substantially perpendicular to a longitudinal direction of the discharge spaces.

Embodiment 4

Figure 11:
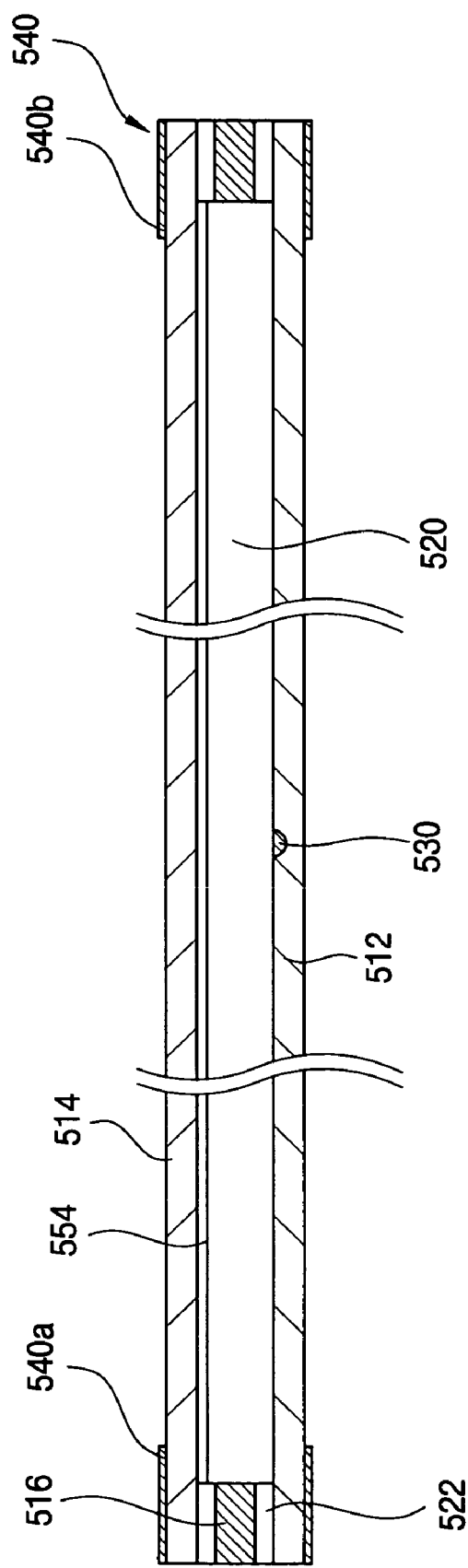
FIG. 11 is a cross-sectional view taken along a virtual line that is substantially parallel with a longitudinal direction of a surface light source device according to a fourth exemplary embodiment of the present invention.

FIG. 11 is a cross-sectional view taken along a virtual line that is substantially parallel with a longitudinal direction of a surface light source device according to a fourth exemplary embodiment of the present invention.

Referring to FIG. 11, a surface light source device 500 according to the present embodiment includes a light source body, at least one partition wall 520, an isolating member 530 and a voltage applying part 540.

The light source body includes first and second substrates 512 and 514, and a sealing member 516. The first substrate 512 has a light-reflecting surface, and the second substrate 514 has a light-exiting surface. The sealing member 516 seals a space between the first and second substrates 512 and 514 to define an internal space. The partition wall 520 divides the internal space into a plurality of discharge spaces.

A connection hole that connects the discharge spaces isolated through the partition wall is formed on the first substrate 512. That is, in Embodiment 2, the connection hole is formed at the partition wall, but in Embodiment 4, the connection hole is formed at the first substrate 512.

When discharge gas is injected into the discharge spaces connected to each other through the connection hole, the isolating member 530 seals the connection hole.

The first and second substrates 512 and 514, the partition wall 520 and the sealing member 516 are connected to each other through frit 522.

The voltage applying part 540 includes first and second electrodes 540a and 540b. The first and second electrodes 540a and 540b are disposed on an end portion of the light source body, respectively. The first and second electrodes 540a and 540b are disposed such that a longitudinal direction of the first and second electrodes 540a and 540b is substantially perpendicular to a longitudinal direction of the discharge spaces.

Embodiment 5

Figure 12:
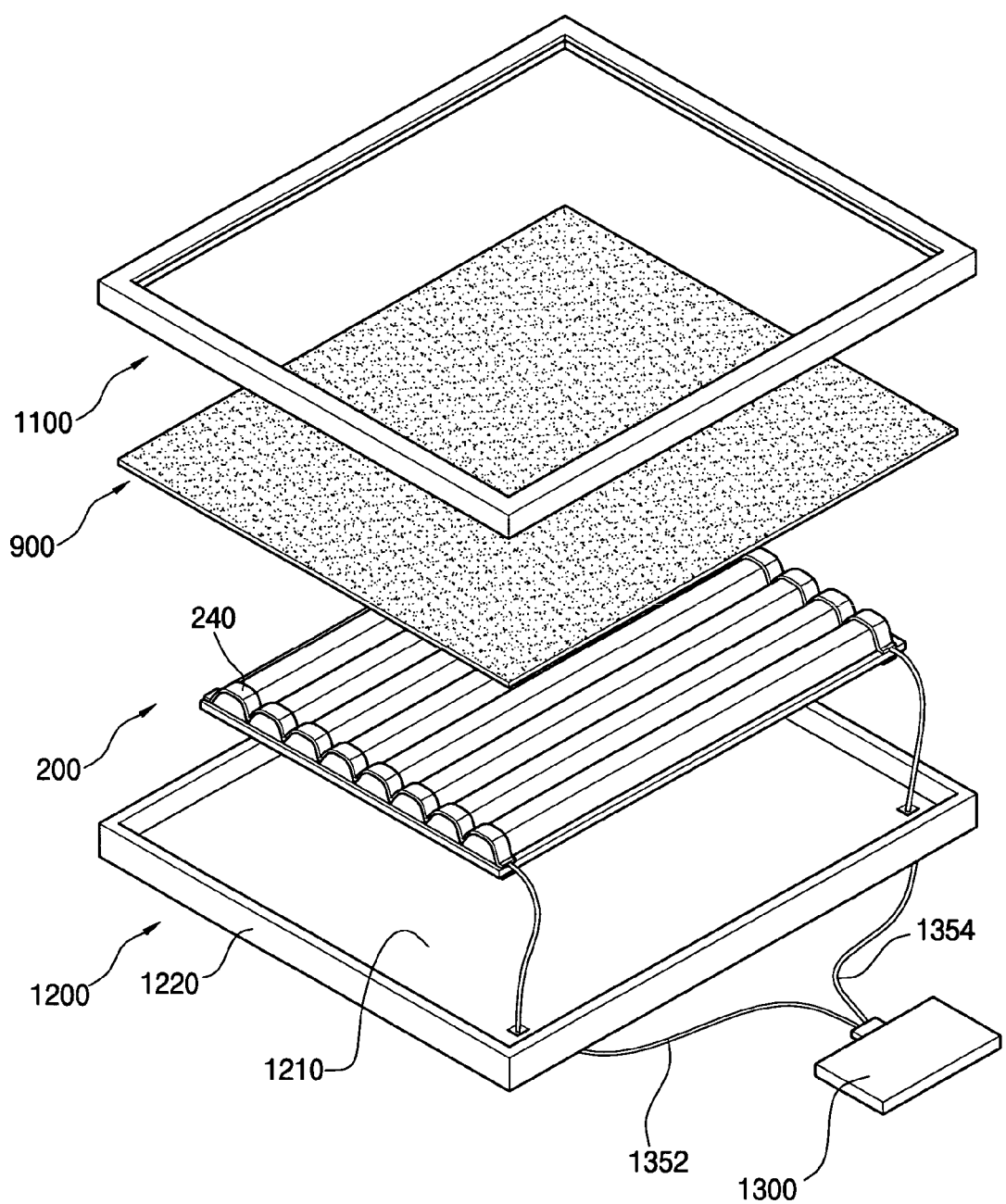
FIG. 12 is an exploded perspective view illustrating a back light unit having the surface light source in FIG. 2 according to a fifth embodiment of the present invention.

FIG. 12 is an exploded perspective view illustrating a back light unit having the surface light source in FIG. 2 according to a fifth embodiment of the present invention.

Referring to FIG. 12, a back light unit 1000 in accordance with present embodiment includes the surface light source device 200 according to the Embodiment 1, upper and lower cases 1100 and 1200, an optical sheet 900 and an inverter 1300.

Elements of the surface light source device 200 are previously illustrated with reference to FIG. 2. Thus, any further illustrations of the elements are omitted. Meanwhile, other surface light source devices in accordance with Embodiments 2, 3 and 4 may be employed in the back light unit 1000.

The lower case 1200 includes a bottom face 1210 on which the surface light source device 200 is disposed, and sidewalls 1220 extending from edges of the bottom face 1210. A space for receiving the surface light source device 200 is defined by the bottom face 1210 and the sidewalls 1220.

The inverter 1300 is disposed beneath the lower case 1200. The inverter 1300 generates a voltage for driving the surface light source device 200. The voltage is applied to the voltage applying part 240 of the surface light source device 200 through first and second cables 1352 and 1354.

The optical sheet 900 may include a diffusion sheet (not shown) for uniformly diffusing a light that is irradiated from the surface light source device 400, and a prism sheet (not shown) for providing straightforwardness to the diffusing light.

The upper case 1100 is combined with the lower case 1200 to support the surface light source device 200 and the optical sheet 900. Particularly, the upper case 110 prevents separation of the surface light source device 200 from the lower case 1200. Additionally, an LCD panel (not shown) may be disposed over the upper case 1100.

According to the surface light source device of the present invention, the discharge spaces are completely isolated from each other. Therefore, the current drift effect is prevented.

Having described the exemplary embodiments of the present invention and its advantages, it is noted that various changes, substitutions and alterations can be made herein without departing from the spirit and scope of the invention as defined by appended claims.

What is claimed is:

1. A surface light source device comprising:
   a light source body having an internal space into which a discharge gas is introduced;
   a plurality of partition walls dividing the internal space into a plurality of discharge spaces, the partition walls having connection holes that respectively connect adjacent discharge spaces with each other;
   a plurality of isolating members respectively filling the connection holes to isolate the adjacent discharge spaces from each other; and
   a voltage applying part for applying a voltage to the discharge gas to generate discharges in the discharge spaces isolated by the isolating members,
   wherein each of the isolating member has a softening temperature lower than that of the light source body.

2. The surface light source device of claim 1, wherein the light source body comprises:
   a first substrate having a plate shape;
   a second substrate facing the first substrate; and
   a sealing member disposed between edge portions of the first and the second substrates to define the internal space.

3. The surface light source device of claim 1, wherein the light source body comprises:
   a first substrate; and
   a second substrate integrally formed with the partition walls.

4. A surface light source device comprising:
   a light source body having an internal space into which a discharge gas is introduced, and a plurality of connection holes;
   a plurality of isolating members filling the connection holes, respectively;
   a plurality of partition walls respectively disposed along the isolating members, the partition walls dividing the internal space into a plurality of discharge spaces having stripe shapes, respectively; and
   a voltage applying part for applying a voltage to the discharge gas to generate discharges in the discharge spaces isolated by the isolating members,
   wherein each of the isolating member has a softening temperature lower than that of the light source body.

5. The surface light source device of claim 4, wherein the light source body comprises:
   a first substrate having the connection hole;
   a second substrate facing the first substrate; and
   a sealing member disposed between edge portions of the first and the second substrates to define the internal space.

6. The surface light source device of claim 4, wherein the light source body comprises:
   a first substrate having the connection hole; and
   a second substrate integrally formed with the partition walls.

7. A back light unit comprising:
   a surface light source device including a light source body having an internal space into which a discharge gas is introduced, a plurality of partition walls dividing the internal space into a plurality of discharge spaces, the partition walls having a plurality of connection holes that respectively connect adjacent discharge spaces with each other, a plurality of isolating members respectively filling the connection holes to isolate the adjacent discharge spaces from each other, and a voltage applying part for applying a voltage to the discharge gas to generate discharges in the discharge spaces isolated by the isolating members;
   a case for receiving the surface light source device;
   an optical sheet interposed between the surface light source device and the case; and an inverter for applying a voltage to the voltage applying part,
   wherein each of the isolating member has a softening temperature lower than that of the light source body.

* * * * *